May 1, 1956 B. WALKER 2,743,941
AUTOMATIC BANKING DEVICE FOR VEHICLES
Filed Jan. 6, 1954 2 Sheets-Sheet 1

INVENTOR.
Brooks Walker

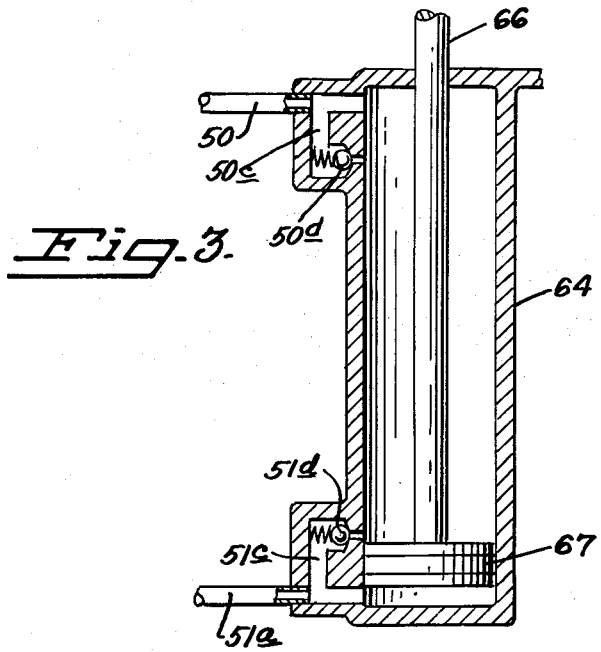
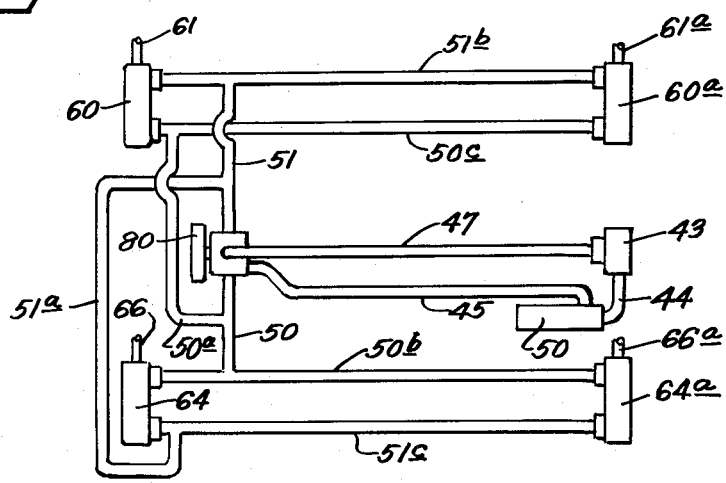

United States Patent Office 2,743,941
Patented May 1, 1956

2,743,941

AUTOMATIC BANKING DEVICE FOR VEHICLES

Brooks Walker, Piedmont, Calif.

Application January 6, 1954, Serial No. 402,532

4 Claims. (Cl. 280—112)

This invention pertains to a device for automatically compensating for the tendency of a vehicle to roll to the outside when rounding a corner on a turn that is not banked sufficiently so that the car is neutral in going around the turn.

The device employs the source of power from the vehicle engine, such as the fluid going to or through the power steering which goes through a valve which is controlled by a pendulum-type weight which swings outwardly if the car is not on a neutrally banked turn to put more pressure on an auxiliary spring between the wheels and the frame or body of the vehicle on the outside and to reduce the pressure of the auxiliary springs on the inside of the turn. The reduction on the inside might even include tension to help pull the normal springs down and reduce the clearance between the axles and the body on the inside and increase it on the outside. There has been one attempt to accomplish this result in the prior art, wherein the vacuum from the engine is utilized and controlled by a mercury switch to pull the springs down on the inside of the turn on one front wheel through a vacuum-operated cylinder or bladder. However, this invention involves changing the loading on mechanical springs to effect a tendency to correct the roll of a car in rounding the turn and to tilt the car towards the inside of the turn within certain limits of the available distance between the vehicle springs and the frame. It is probably not feasible to pull the frame right down on the axle on the inside nor to lift it in an excessive distance on the outside, so that in all probability complete tilting of the car to where the pendulum weight hangs neutral will not be possible on all turns but the invention will provide means for correcting the tendency of the car to tilt the wrong way when going around turns and within limits make it tilt towards the inside of the turn, thereby increasing the safety of the vehicle in preventing a tendency of the car to roll over as compared with a vehicle that does not have this device and also increasing the rider's comfort by giving the vehicle passengers a ride somewhat similar to the effect of riding on a fully banked turn.

Other features of the invention will be more particularly pointed out in the accompanying specifications and claims.

I have illustrated my invention by way of example in the accompanying drawings, in which:

Fig. 3 is an enlarged section of cylinder 64 shown in Figs. 1 and 2. Fig. 4 is a schematic view of the application of the invention to the four corners of the vehicle.

In all figures, like numerals of reference refer to the corresponding parts.

Figure 1:
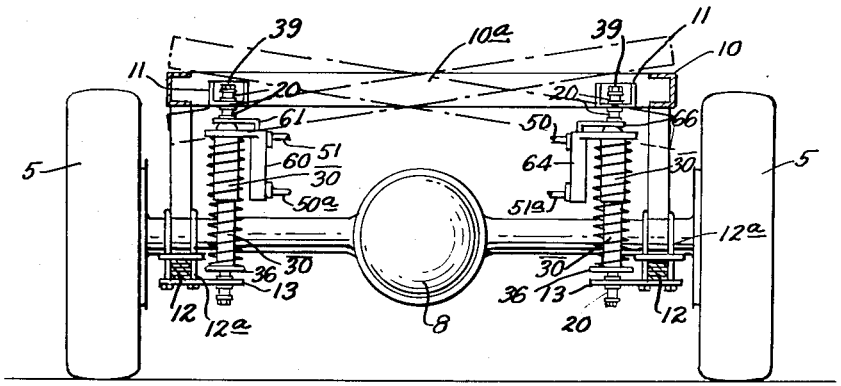
Fig. 1 is a rear elevation, partly cut away, showing the portion of a vehicle employing this invention.
Figure 2:
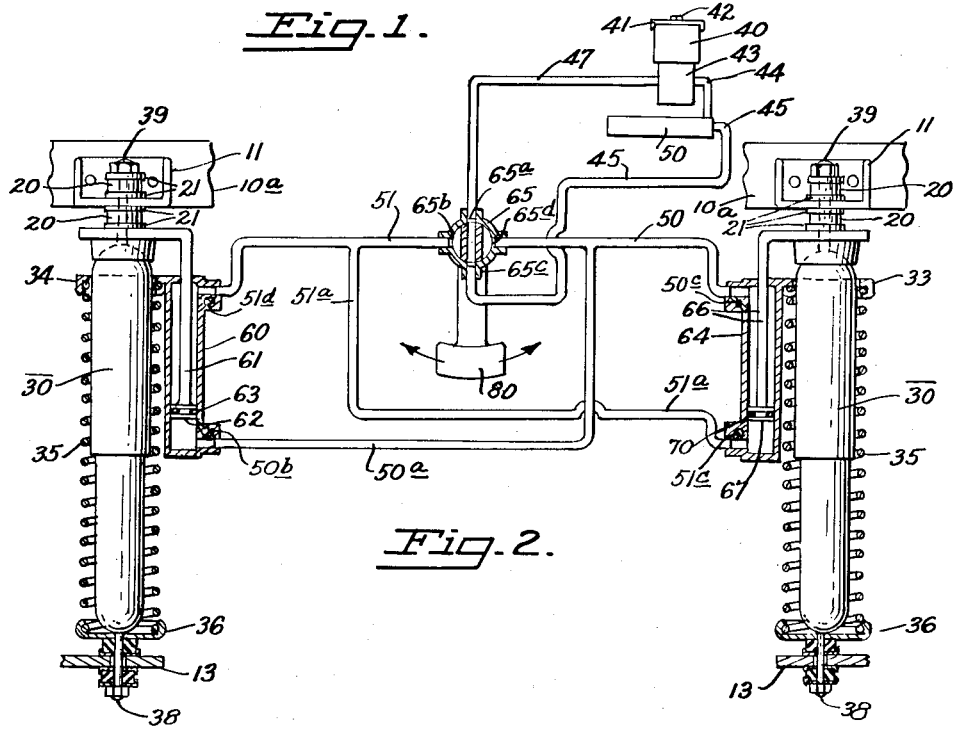
Fig. 2 is an enlarged rear elevation, partly in section, partly diagrammatic, showing in more detail the construction shown in Fig. 1.

In Figs. 1 and 2, I have shown the vehicle frame 10, having a cross member 10a, on which are mounted brackets 11 which carry the upper end of telescoping-type shock absorber 30. These telescoping-type shock absorbers are attached at the lower end to spring plate 13 which is secured under the rear leaf springs 12 by the usual U-bolts 12a. U-bolts 12a secure the springs 12 to the rear axle 8 which carries rear ground engaging wheels 5. Mounted on the outside of the telescoping-type shock absorber 30 is a coil spring 35 secured at its lower end to spring receiving washer 36. At the left side of the vehicle the upper end of spring 35 is secured to traveling member 34 which mounts cylinder 60. In cylinder 60 is mounted a piston 62 with a seal, such as O-ring 63. At the right side of the vehicle traveling member 33 carries cylinder 64 in which is mounted piston 67 and seal 70. Piston 67 is mounted on piston rod 66 which is formed into a right angle and washer at its top to be carried on bolt 39 extending from the top of shock absorber 30 on the right side of the vehicle. On the left shock absorber 30 piston 62 is mounted on a piston rod 61 which is formed at a right angle and washer at its upper end for mounting on bolt 39 on the left hand shock absorber. An engine driven pump 43 of the power steering type carries a reservoir 40. A cover 41 held on by bolt 42 has an outlet pipe 44 which connects the pump to power steering unit 50 in a conventional manner. From power steering unit 50, line 45 goes to port 65c of valve 65. This valve is of the open-center 4-way type controlled by weight 80 which is allowed to swing to the right or to the left when the car rounds a turn. Port 65a is connected to the intake of the pump through line 47. Port 65b is on the left side of the banking valve 65 and port 65d is on the right side of the valve. Port 65b is connected to line 51 which goes to the top of cylinder 60 and through line 51a to the bottom of cylinder 64 at the right side of the vehicle, so that when pressure flows into line 51, as is the case when weight 80 is swung to the right when rounding a lefthand turn, it causes traveling member 34 to rise and either take the tension off lefthand spring 35 or to put a pulling tension on the spring to reduce the clearance between the axle 8 and the frame 10 on the left side of the vehicle. At the same time pressure through line 51a enters at the bottom of righthand cylinder 64 forcing traveling member 33 downward to place righthand spring 35 under compression to tend to increase the clearance between axle 8 and frame 10 at the right side of the car. When the car is rounding a turn to the left, weight 80 swings to the right so that port 65c is connected with port 65b rather than having port 65c connected to port 65a, which is the true center position, offering no resistance to the power steering fluid passing through tilt valve 65 when the weight 80 is in its neutral downward position, as shown in Fig. 2. When weight 80 has swung to the right as the car is turning to the left, line 50 which is connected to the top of cylinder 64 and 50a which is connected to the bottom of cylinder 60 are connected through valve 65 so that flow is provided from port 65d to 65a and then through line 47 to the intake to pump 43 and, in turn, to reservoir 40 so as not to resist the action as described of the fluid going through lines 51 and 51a which are causing the auxiliary springs 35 on the right and left to be loaded in such a manner that the vehicle body will bank to the inside of a lefthand turn. When the car is rounding a continuous turn and the weight 80 has swung all the way to the right—for example: piston 63 will be forced all the way to the bottom of cylinder 60 and piston 67 will be forced all the way to the top of cylinder 64—no flow might be available for power steering and excessive hydraulic pressures might result. To eliminate this I have provided bypass ports 51d at the top of cylinder 60, 50b at the bottom of cylinder 60, 50c at the top of cylinder 64, and 51c at the bottom of cylinder 64. Each of these bypasses has a check valve 51d allowing flow only from the cylinder into the line and not from the line to the cylinder. If it were not for this check valve, pressure could flow through the bypass to the opposite side of the piston when the weight 80 swings to the other side. These bypasses will allow continuous flow from the power steering pump through the power steering unit after the pistons in cylinders 60 and 64 have reached the end of their stroke. While they are moving from one position to the other, the oil flowing to one side of the piston displaces a somewhat similar amount on the opposite side of the piston to provide flow through power steering so as to be effective at all times when rounding a turn. If the turn is being rounded on which the leveling effect of the overloads is sufficient so that the weight 80 can return to neutral, then flow is provided through the open-center portion of the valve which connects 65c with 65a. When the car turns to the right weight 80 swings to the left so that pressure port 65c would be connected with port 65d to cause pressure to flow out through lines 50 and 50a to cause traveling element 33 to rise, reducing the compression on righthand spring 35, or actually placing a tension on this spring while at the same time acting on the bottom of cylinder 60 to cause a loading of cylinder 60 to cause a loading of the lefthand spring 35 to cause a combined change in the spring support at each side of the vehicle so as to cause tilting of the vehicle frame and body relative to axle 8 in a clockwise direction so that the body will tend to bank inwardly in rounding a righthand turn rather than tilting outwardly in a clockwise manner if such compensation is not provided. It is to be understood that air pressure, from a source of air pressure such as is used in supplying an air brake system or supplying the air for any other purposes on a vehicle or fluid under pressure from any type of power source, could also be used for actuating the mechanism through tilt valve 65 in place of hydraulic pressure from the power steering, as is shown in this example. It is also to be understood that I have only shown two shock absorbers in this instance. All four shock absorbers on front and rear wheels could also be connected as shown in Fig. 4 by running parallel lines 50b to the top of the vehicle righthand cylinders 64 and 64a on the righthand shock absorbers and connecting the top of cylinders 60 and 60a on the left side of the car and also connecting the bottom of the cylinders 60 and 60a on the vehicle left and the bottom of cylinders 62 and 64a on the vehicle right so that the one valve 65 could control auxiliary springs on the front or rear of the car. It is also to be understood that although I have shown auxiliary springs mounted on the shock absorbers, auxiliary springs could be of the cantilever type, as shown in my co-pending application, U. S. patent application Serial No. 384,083, or any other type that may be desired, wherein the loading or unloading of the auxiliary springs on either side of the car is accomplished by means of a valve whose operation is sensitive to the sideward motion of the car in rounding turns.

Other features of the invention will be more particularly pointed out in the accompanying claims.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. A vehicle, including in combination a frame; ground-engaging front and rear wheels; structure on which said wheels are mounted; resilient means between said structure and said frame, through which said structure and wheels support said frame, a power steering system for the front wheels carried by said frame including a hydraulic system with a pump, a booster cylinder, and hydraulic fluid; compensating means operated by said hydraulic system for acting on said resilient means on both sides of said vehicle to increase and reduce the resilient force thereof, said compensating means including a piston and bypass means operated by motion of said piston so that the fluid continues to circulate through said hydraulic system to said compensating means and back to said hydraulic system even after the piston has reached the approximate limit of its travel; and centrifugal force-controlled valve means on said hydraulic system for controlling the distribution of fluid to said compensating means, said centrifugal force-controlled valve operating to provide more resilient support per inch of travel between said frame and said structure on the outer side of said vehicle when said vehicle is rounding an unbanked turn and simultaneously operating to reduce the resilient force per inch of travel between said frame and said structure on the inside side of said vehicle, the fluid pressure being available to the power steering system at all times, due to said bypass means.

2. The vehicle of claim 1, in which said resilient means includes shock absorbers on each side of said vehicle between said structure and said frame and in which said compensating means is connected to and operates on said shock absorbers.

3. The vehicle of claim 2, in which said shock absorbers are of the telescoping type.

4. The vehicle of claim 2, in which said shock absorbers comprise telescoping shock absorbers with coil springs mounted thereon and in which said compensating means comprise a hydraulic cylinder mounted parallel to said shock absorbers with a piston rigidly connected to one element of said shock absorber, so that the fluid pressure in said cylinder either augments or partially counteracts the force of said spring.

References Cited in the file of this patent

UNITED STATES PATENTS

| | | |
|---|---|---|
| 2,353,503 | Rost | July 11, 1944 |
| 2,474,471 | Dolan | June 28, 1949 |
| 2,490,719 | Tank | Dec. 6, 1949 |

FOREIGN PATENTS

| | | |
|---|---|---|
| 518,848 | Great Britain | Mar. 8, 1940 |